United States Patent
Lee

(10) Patent No.: US 8,427,392 B2
(45) Date of Patent: Apr. 23, 2013

(54) CIRCUIT FOR DETECTING AN EXTERNAL DISPLAY DEVICE ADAPTED TO NOTEBOOK COMPUTER AND DETECTING METHOD THEREOF

(75) Inventor: Yong-Der Lee, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 491 days.

(21) Appl. No.: 12/730,700

(22) Filed: Mar. 24, 2010

(65) Prior Publication Data

US 2010/0245210 A1    Sep. 30, 2010

(30) Foreign Application Priority Data

Mar. 31, 2009 (TW) .............................. 98110643 A

(51) Int. Cl.
*G09G 5/00* (2006.01)
(52) U.S. Cl.
USPC ............................................ 345/3.1; 345/1.1
(58) Field of Classification Search .................. 345/1.1, 345/3.1
See application file for complete search history.

(56) References Cited

U.S. PATENT DOCUMENTS

| 6,038,670 A | 3/2000 | Oh | |
| 2006/0023121 A1* | 2/2006 | Obara et al. | 348/554 |
| 2006/0181480 A1* | 8/2006 | Yee | 345/3.1 |

FOREIGN PATENT DOCUMENTS

CN       1315036 C       5/2007

\* cited by examiner

*Primary Examiner* — Kevin M Nguyen
*Assistant Examiner* — Sepideh Ghafari
(74) *Attorney, Agent, or Firm* — Jianq Chyun IP Office

(57) ABSTRACT

A notebook computer having a display port capable of outputting a vertical synchronous signal, a horizontal synchronous signal, a red signal, a green signal, and a blue signal to an external display device to display an image is disclosed. The notebook computer includes a monitor device built in the notebook computer, an embedded controller capable of outputting an enable signal and a detecting circuit receiving a first signal, a second signal and the enable signal. The first signal is the vertical synchronous signal or the horizontal synchronous signal. The second signal is the red signal, the green signal or the blue signal. When the external display device is disconnected with the display port, the detecting circuit may determine the second signal according to the actuation of the enable signal at a blanking interval of the first signal and switch the image to the monitor device automatically.

22 Claims, 4 Drawing Sheets

CIRCUIT FOR DETECTING AN EXTERNAL DISPLAY DEVICE ADAPTED TO NOTEBOOK COMPUTER AND DETECTING METHOD THEREOF

FIELD OF THE INVENTION

The invention relates to a circuit for detecting an external display device and a detecting method thereof and, more particularly, to a detecting circuit for detecting an external display device adapted to a notebook computer and a detecting method thereof.

BACKGROUND OF THE INVENTION

It is well known that a notebook computer is additionally equipped with an display port besides a liquid crystal display (LCD) monitor. The display port is used for being connected with an external display device using a D-sub connector to allow a user to make a presentation or give a lecture. Generally speaking, the external display device may be a projector, a LCD monitor or a CRT monitor.

Usually, the notebook computer may switch an image via hot keys on the keyboard. That is, the image may be selectively displayed on only one of the LCD monitor of the notebook computer and the external display device, or both of them. Thus, after the D-sub connector of the external display device is connected to the notebook computer, the image may be switched by pressing the hot keys on the keyboard. After the presentation or the lecture is finished, the image may be switched to the LCD monitor of the notebook computer by pressing the hot keys on the keyboard again. Afterwards, the D-sub connector of the external display device is removed.

Nowadays, a notebook computer in a specific form may actively detect whether the D-sub connector of the external display device is removed and automatically switch the image to the LCD monitor of the notebook computer. Thus, the user does not need to use the hot keys on the keyboard to complete switching.

The conventional detecting method for detecting whether the external display device is disconnected is realized by software. Two pins of the pins in the D-sub connector are used as an inter-integrated circuit ($I^2C$) via which commands or parameters may be transmitted between the notebook computer and the external display device.

That is, when the external display device is connected to a notebook computer using the D-sub connector, the central processing unit (CPU) of the notebook computer may execute an interrogation program periodically (for example, it may execute the interrogation program per 0.5 seconds), and the commands and the parameters are transmitted between the notebook computer and the external display device via the $I^2C$. When the external display device responds to the commands or parameters, the CPU may know that the D-sub connector of the external display device is still connected with the notebook computer. On the contrary, when the external display device does not respond to the commands or the parameters, the CPU knows that the D-sub connector of the external display device is removed. Then, the notebook computer switches the image to the LCD monitor of the notebook computer automatically, and the hot keys are not used.

When the D-sub connector of the external display device is connected to the notebook computer, the CPU of the notebook should execute the interrogation program periodically to know the connecting situation of the external display device, which reduces the whole performance of the notebook computer.

SUMMARY OF THE INVENTION

The invention provides a detecting circuit for detecting an external display device and a detecting method. When the external display device is disconnected with the notebook computer, the detecting circuit may generate an interrupt signal to the CPU to make the CPU switch an image to the LCD monitor of the notebook computer automatically.

The invention provides a notebook computer having an display port capable of outputting a vertical synchronous signal, a horizontal synchronous signal, a red signal, a green signal and a blue signal to an external display device to display an image. The notebook computer includes a monitor device built in the notebook computer, an embedded controller capable of outputting an enable signal and a detecting circuit receiving a first signal, a second signal and the enable signal. The first signal is the vertical synchronous signal or the horizontal synchronous signal, and the second signal is the red signal, the green signal or the blue signal. When the external display device is disconnected with the display port, the detecting circuit is capable of determining the voltage level of the second signal according to the actuation of enable signal at a blanking interval of the first signal to generate an interrupt request signal and switch the image to the monitor device automatically.

The invention further provides a connection detecting method adapted to a notebook computer to detect an external display device. The notebook computer has a display port capable of outputting a vertical synchronous signal, a horizontal synchronous signal, a red signal, a green signal and a blue signal. The connection detecting method includes the following steps of receiving a first signal, a second signal and an enable signal after an external display device is connected to the display port, providing a power supply voltage to the second signal according to the first signal and the enable signal at a blanking interval of the first signal and determining the connection status between the external display device and the display port according to a voltage level of the second signal. The first signal is the vertical synchronous signal or the horizontal synchronous signal, and the second signal is the red signal, the green signal or the blue signal.

BRIEF DESCRIPTION OF THE DRAWINGS

These and other features, aspects and advantages of the present invention will become better understood with regard to the following description, appended claims, and accompanying drawings.

DETAILED DESCRIPTION OF THE PREFERRED EMBODIMENT

Figure 1A:
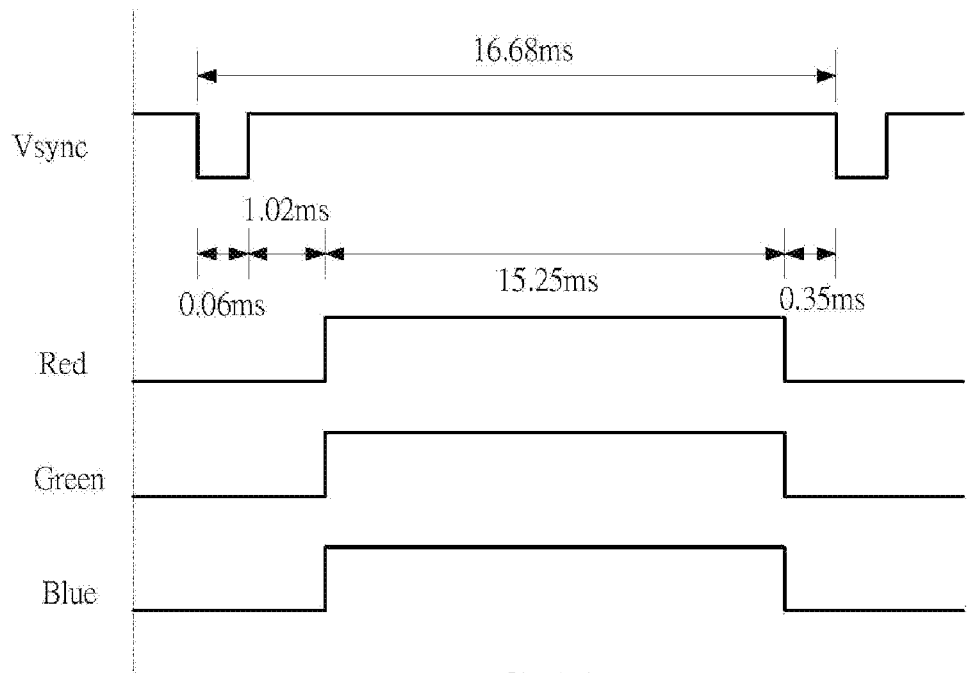
FIG. 1A and FIG. 1B are schematic diagrams showing the graphic signals on the D-SUB connector.
Figure 1B:
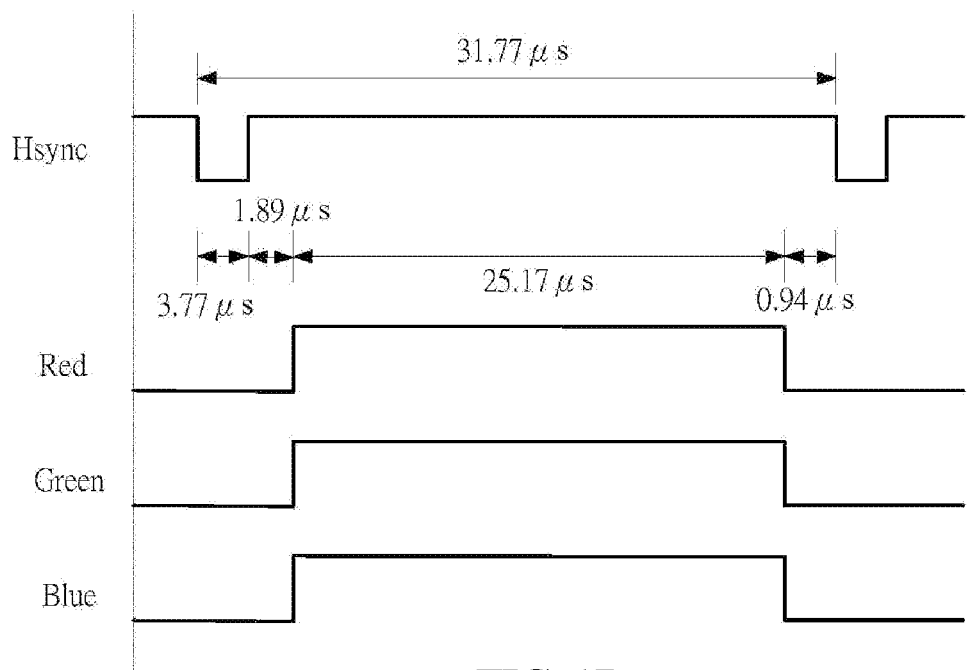

FIG. 1A and FIG. 1B are schematic diagrams showing the graphic signals on a common D-sub connector. The signals on the five pins in the D-sub connector include a vertical synchronous signal Vsync, a horizontal synchronous signal Hsync, a red signal Red, a green signal Green and a blue signal Blue. Taking a monitor device with 640×480 resolution and 60 Hz refresh frequency as example, the period of the vertical synchronous signal Vsync lasts 16.68 ms, as shown in FIG. 1A. The period of the vertical synchronous signal Vsync starts when the low level generates, and the width of the low level is 0.06 ms. After the low level ends and 1.02 ms is passed, the red signal Red, the green signal Green and the blue signal Blue should output 640×480 pixels, and it consumes 15.25 ms in outputting the 640×480 pixels. Afterwards, next period of the vertical synchronous signal Vsync starts after 0.35 ms. Furthermore, each period of the vertical synchronous signal further includes 480 periods of the horizontal synchronous signal Hsync.

As shown in FIG. 1B, the period of the horizontal synchronous signal Hsync lasts 31.77 μs. The width of the low level of the horizontal synchronous signal Hsync is 3.77 μs. After the low level ends and 1.89 μs is passed, the red signal Red, the green signal Green and the blue signal Blue should output 640 pixels, and it consumes 25.17 μs in outputting the 640 pixels. Afterward, the next period of the horizontal synchronous signal starts after 0.94 μs.

As shown in FIG. 1A and FIG. 1B, when the vertical synchronous signal Vsync and the horizontal synchronous signal Hsync are at the low level, the red signal Red, the green signal and the blue signal Blue do not output any pixel. Thus, the low level interval of the vertical synchronous signal Vsync is defined to be a vertical blanking interval (VBI for short). Similarly, the low level interval of the horizontal synchronous signal Hsync is defined to be a horizontal blanking interval (HBI for short).

Figure 2:
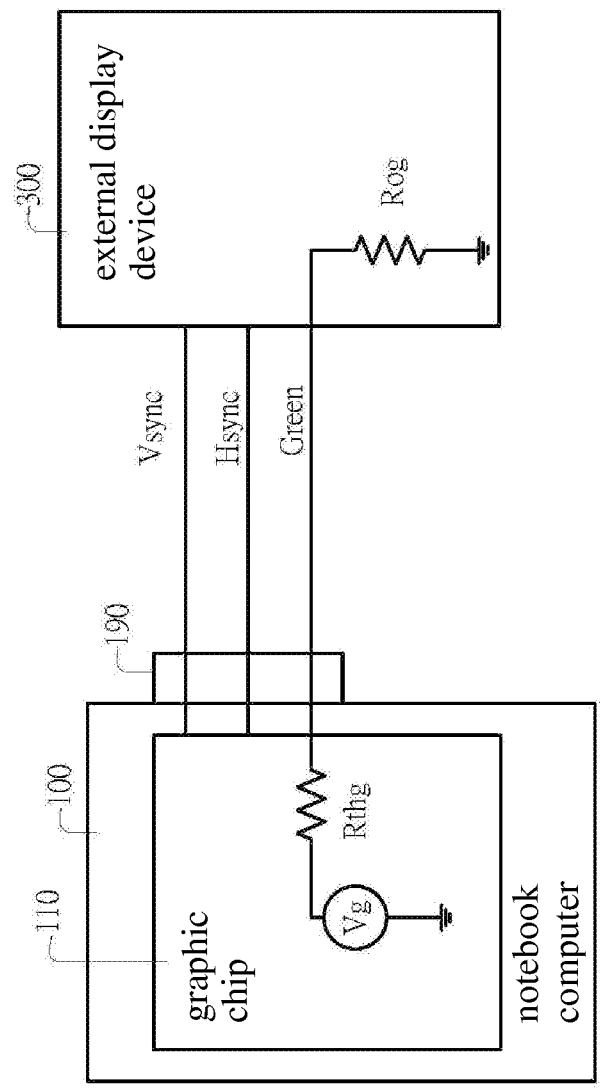
FIG. 2 is a schematic diagram showing the circuits of the external display device and the graphic chip.

FIG. 2 is a schematic diagram showing the circuits of the external display device and the graphic chip. The signals on the D-sub connector on the notebook computer 100 are all outputted by a graphic chip 110. Generally speaking, the graphic chip may be a stand along graphic chip or an integrated graphic chip in the north bridge chip.

According to the specification, taking the green signal Green as an example, the green signal source Vg in the graphic chip 110 may generate green signals. The amplitude of the green signal source Vg is about 1.6 volts, and the resistance of the equivalent resistor Rthg is about 75 ohms. In addition, an output resistor on the external display device 300 is connected to the green signal, and the resistance of the output resistor is 75 ohms. Via the control of the vertical synchronous signal Vsync and the horizontal synchronous signal Hsync, when the external display device 300 is connected to the D-sub connector 190 of the notebook computer 100, the amplitude of the pixels on the green signal Green is about 0.8 volts. On the contrary, when the external display device 300 is not connected to the notebook computer 100, the amplitude of the pixels on the green signal Green is about 1.6 volts. The circuit characteristics of the red signal Red and the blue signal Blue are the same as those of the green signal Green, and therefore they are not described for a concise purpose.

According to the embodiment of the invention, the detecting circuit in the embodiment may detect whether the external display device is connected with the D-sub connector 190 of the notebook computer at the VBI or the HBI. When the external display device is detected to be disconnected, the detecting circuit may generate an interrupt signal to the CPU. On the contrary, when the external display device is detected to be connected, the detecting circuit does not generate the interrupt signal to the CPU.

Figure 3:
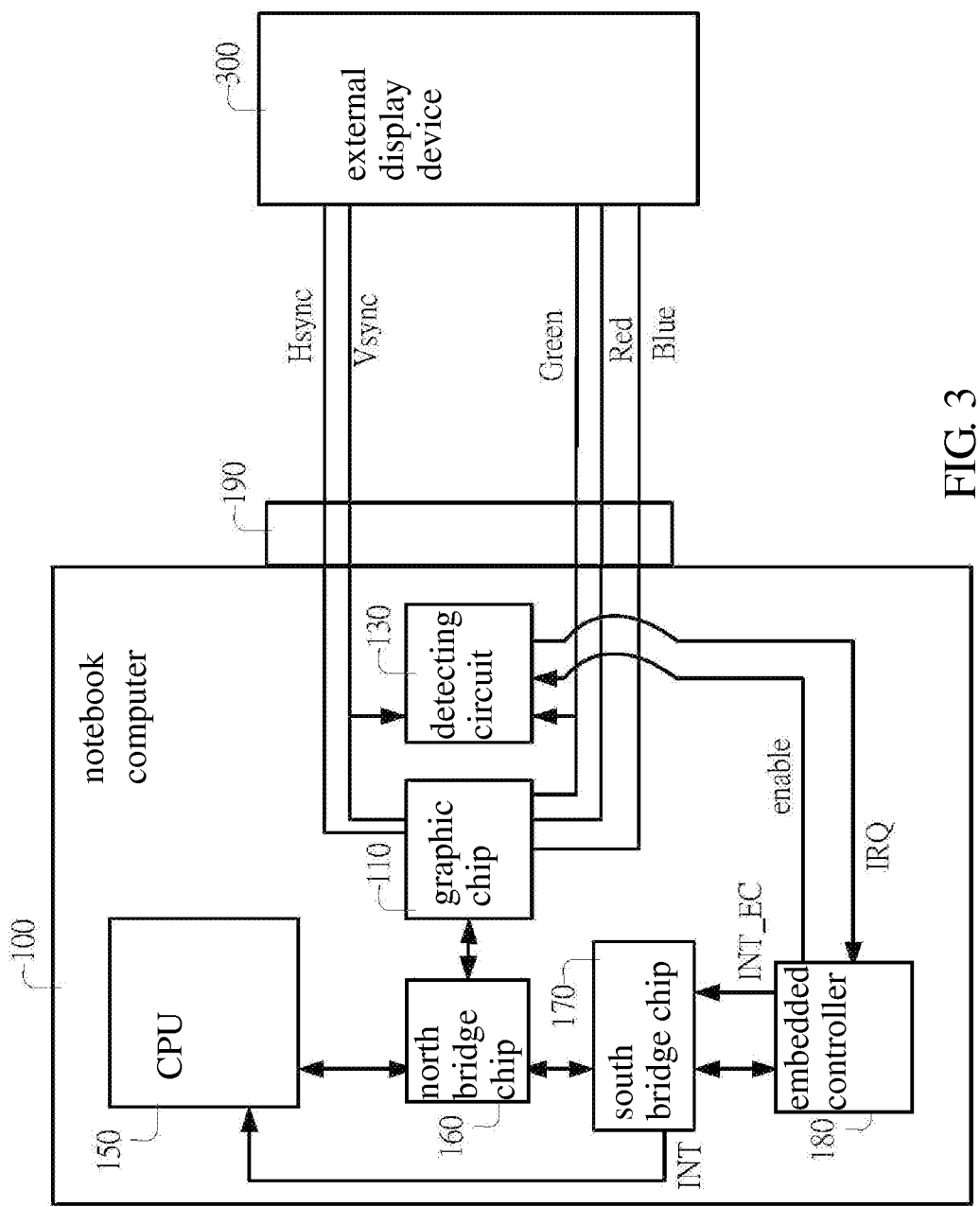
FIG. 3 is a schematic diagram showing the notebook computer and the detecting circuit thereof in an embodiment of the invention.

FIG. 3 is a schematic diagram showing a notebook computer and a detecting circuit of the embodiment of the invention. The notebook computer 100 includes a CPU 150, a north bridge chip 160, a south bridge chip 170, an embedded controller 180, a graphic chip 110 and a detecting circuit 130. The north bridge chip 160 is connected to the CPU 150 and the south bridge chip 170. The embedded controller 180 is connected to the south bridge chip 170. The graphic chip 110 is connected to the north bridge chip 160, and it may output a vertical synchronous signal, a horizontal synchronous signal, a red signal Red, a green signal Green and a blue signal Blue which are transmitted to the external display device 300 via the D-sub connector 190.

The detecting circuit 130 may receive a first signal, a second signal and an enable signal and output an interrupt request signal (IRQ). The enable signal is generated by the embedded controller 180. The first signal may be the vertical synchronous signal Vsync or the horizontal synchronous signal Hsync. The second signal may be the red signal Red, the green signal Green or the blue signal Blue. In FIG. 3, the first signal is the vertical synchronous signal, and the second signal is the green signal.

Figure 4:
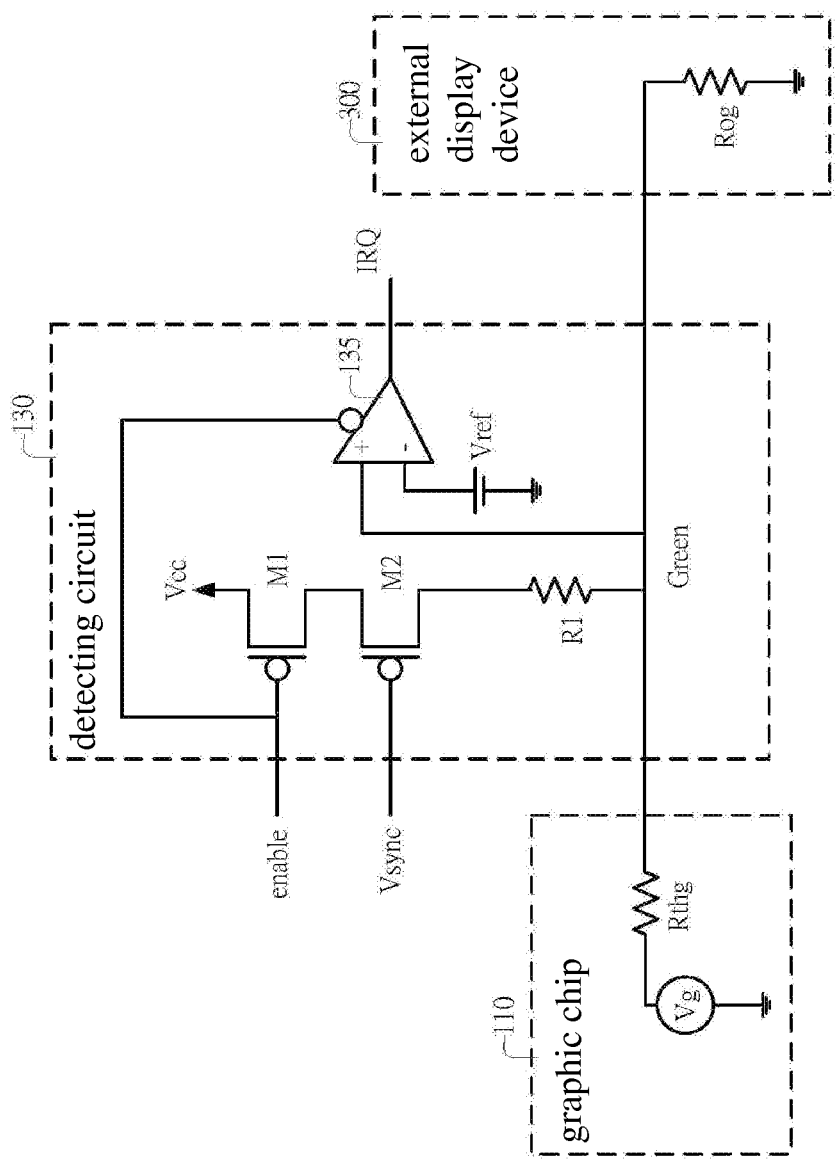
FIG. 4 is a schematic diagram showing the first embodiment of the detecting circuit.

FIG. 4 shows the first embodiment of the detecting circuit in the invention. The detecting circuit 130 includes a first transistor M1, a first transistor M2, a first resistor R1, a comparator 135 and a reference voltage Vref. The source of the first transistor is connected to a power supply voltage Vcc, and the gate of the first transistor receives an enable signal. The source of the second transistor is connected to the drain of the first transistor, and the gate of the second transistor receives a vertical synchronous signal. One end of the first resistor R1 is connected to the drain of the second transistor, and the other end of the first resistor R1 receives the green signal. The positive input of the comparator 135 receives the green signal, and the negative input of the comparator 135 receives the reference voltage Vref. Furthermore, the comparator 135 receives an enable signal and is actuated when the enable signal is at a low level. The output of the comparator 135 may output the IRQ. According to the embodiment of the invention, the first resistor R1 is 150 ohms, the power supply voltage Vcc is 3.3 volts, and the reference voltage Vref is 1 volt.

When the external display device 300 is connected to the D-sub connector of the notebook computer 100, and the vertical synchronous signal Vsync is at the high level, the second transistor M2 is turning off. Then, the green signal Green may output pixels to the external display device 300 normally.

When the external display device 300 is connected to the D-sub connector of the notebook computer 300, and the vertical synchronous signal Vsync is at the low level, the vertical synchronous signal is at the VBI and the green does not output any pixel data. When the vertical synchronous signal is at the VBI, and the enable signal is actuated (at the low level), the first transistor is on. At that moment, the voltage on the green signal Green is $$\frac{(Rthg \mathbin{/\mkern-6mu/} Rog)}{R1 + (Rthg \mathbin{/\mkern-6mu/} Rog)} Vcc = 0.66 \text{ V}.$$

When the external display device 300 is disconnected with the notebook computer 100, the vertical synchronous signal Vsync is at the VBI and the enable signal is actuated (at the low level), the first transistor is on. At that moment, the voltage on the green signal Green is $$\frac{Rthg}{R1+Rthg}Vcc=1.1\ \text{V}.$$

As stated above, after the external display device 300 is connected to the notebook computer 100, the graphic chip 110 may output the vertical synchronous signal Vsync, the horizontal synchronous signal Hsync, the red signal Red, the green signal Green and the blue signal Blue. The CPU 150 may control the embedded controller 180 to output the enable signal at the low level periodically. When the enable signal is at the high level, the detecting circuit 130 is not actuated. When the enable signal is at the low level, the detecting circuit 130 is actuated.

Therefore, at the VBI, the external display device may be detected according to the enable signal. Obviously, when the enable signal is at the low level and the external display device 300 is connected to the notebook computer 100, the positive input of the comparator 135 is 0.66 volts, the negative input is 1 volt, the IRQ outputted by comparator 135 is at the low level, and the embedded controller 180 does not output the embedded controller interrupt signal (INT_EC).

On the contrary, when the enable signal is at the low level and the external display device 300 is disconnected with the notebook computer 100, the positive input of the comparator 135 is 1.1 volts, the negative input is 1 volt, and the IRQ outputted by the comparator 135 is at the high level. Therefore, the embedded controller 180 outputs the embedded controller interrupt signal INT_EC to the south bridge chip 170, and the south bridge chip 170 may output the system interrupt signal INT to the CPU 150 immediately. When the CPU 150 receives the system interrupt signal INT, the CPU 150 may automatically switch the image to the LCD screen of the notebook computer, and the user does not need to manually switch the image using the hot keys on the keyboard.

According to the first embodiment, the CPU 150 does not need to periodically execute the interrogation program when the external display device is connected, and therefore, the efficiency of the CPU is not reduced. The detecting circuit 130 of the invention is actuated at the VBI, and therefore, the detecting circuit 130 does not affect the green signal.

Similarly, when the first signal is the horizontal synchronous signal, the detecting circuit is actuated at the HBI, and it does not affect the second signal.

Although the present invention has been described in considerable detail with reference to certain preferred embodiments thereof, the disclosure is not for limiting the scope of the invention. Persons having ordinary skill in the art may make various modifications and changes without departing from the scope of the invention. Therefore, the scope of the appended claims should not be limited to the description of the preferred embodiments described above.

What is claimed is:

1. A notebook computer having an display port capable of outputting a first signal and a second signal to an external display device to display an image, the notebook computer comprising:
   a monitor device built in the notebook computer;
   an embedded controller capable of outputting an enable signal; and
   a detecting circuit receiving the first signal and the second signal, the detecting circuit comprising:
      a first transistor, wherein the source of the first transistor is connected to a power supply voltage, and the gate of the first transistor receives the enable signal;
      a first resistor having two ends, wherein one end of the two ends receives the second signal; and
      a comparator, wherein the positive input of the comparator receives the second signal, the negative input of the comparator receives a reference voltage, the comparator receives the enable signal and is actuated according to the enable signal, and the output of the comparator is capable of outputting a interrupt request signal,
   wherein when the external display device is disconnected with the display port, the detecting circuit is capable of determining the voltage level of the second signal according to the actuation of the enable signal at a blanking interval of the first signal to generate an interrupt request signal and switch the image to the monitor device automatically.

2. The notebook computer according to claim 1, wherein the first signal comprises a vertical synchronous signal and a horizontal synchronous signal, and the second signal comprises a red signal, a green signal or a blue signal.

3. The notebook computer according to claim 1, wherein the enable signal is capable of controlling the detecting circuit to be actuated or not periodically.

4. The notebook computer according to claim 1, wherein a D-sub connector of the external display device is capable of being inserted to the display port.

5. The notebook computer according to the claim 1, wherein the blanking interval is a vertical blanking interval of the vertical synchronous signal or a horizontal blanking interval of the horizontal synchronous signal.

6. The notebook computer according to claim 1, wherein the embedded controller is capable of generating an embedded controller interrupt signal to a south bridge chip according to the interrupt request signal to make the south bridge chip transmit a system interrupt signal to a central processing unit (CPU) of the notebook computer.

7. The notebook computer according to claim 6, wherein the CPU is capable of switching the image to a liquid crystal display monitor of the notebook computer according to the system interrupt signal.

8. The notebook computer according to claim 1, wherein the detecting circuit further comprises:
   a second transistor, wherein the source of the second transistor is connected to the drain of the first transistor, the drain of the second transistor is connected to other end of the first resistor, and the gate of the second transistor receives the first signal.

9. A connection detection method for detecting an external display device adapted to a notebook computer, the notebook computer having an display port capable of outputting a first signal and a second signal, the connection detection method comprising the steps of:
   receiving a first signal, a second signal and an enable signal after an external display device is connected to the display port;
   providing a power supply voltage to the second signal, the power supply voltage passes a first resistor to the second signal to make the second signal generate a first divided voltage as the voltage value according to synchronization control of the first signal and the enable signal at a blanking interval of the first signal; and
   determining the connecting status between the external display device and the display port according to a voltage level of the second signal;
   wherein the first signal is the vertical synchronous signal or the horizontal synchronous signal, and the second signal is the red signal, the green signal or the blue signal.

10. The connection detecting method according to claim 9, further comprising the step of confirming that external display device is disconnected with the display port when the voltage level is larger than a reference voltage.

11. The connection detection method according to claim 10, further comprising the step of generating an interrupt request signal.

12. The connection detecting method according to claim 11, further comprising the step of making a CPU of the notebook computer switch an image to a liquid crystal display monitor of the notebook computer according to the interrupt request signal.

13. The connection detection method according to claim 9, further comprising the step of confirming that the external display device is connected to the display port when the voltage level is less than a reference voltage.

14. The connection detecting method according to claim 9, wherein a D-sub connector of the external display device is capable of being inserted into the display port.

15. The connection detecting method according to claim 9, wherein the blanking interval is a vertical blanking interval of the vertical synchronous signal or a horizontal blanking interval of the horizontal synchronous signal.

16. A notebook computer having an display port capable of outputting a first signal and a second signal to an external display device to display an image, the notebook computer comprising:
    a monitor device built in the notebook computer;
    an embedded controller capable of outputting an enable signal; and
    a detecting circuit receiving the first signal and the second signal, the detecting circuit comprising:
        a comparator, wherein the one terminal of the comparator receives the second signal, the one terminal of the comparator receives a reference voltage, the comparator receives the enable signal and is actuated according to the enable signal, and the output of the comparator is capable of outputting a interrupt request signal,
    wherein when the external display device is disconnected with the display port, the detecting circuit is capable of determining the voltage level of the second signal according to the actuation of the enable signal at a blanking interval of the first signal to generate an interrupt request signal and switch the image to the monitor device automatically.

17. The notebook computer according to claim 16, wherein the first signal comprises a vertical synchronous signal and a horizontal synchronous signal, and the second signal comprises a red signal, a green signal or a blue signal.

18. The notebook computer according to claim 16, wherein the enable signal is capable of controlling the detecting circuit to be actuated or not periodically.

19. The notebook computer according to claim 16, wherein a D-sub connector of the external display device is capable of being inserted to the display port.

20. The notebook computer according to the claim 16, wherein the blanking interval is a vertical blanking interval of the vertical synchronous signal or a horizontal blanking interval of the horizontal synchronous signal.

21. The notebook computer according to claim 16, wherein the embedded controller is capable of generating an embedded controller interrupt signal to a south bridge chip according to the interrupt request signal to make the south bridge chip transmit a system interrupt signal to a central processing unit (CPU) of the notebook computer.

22. The notebook computer according to claim 21, wherein the CPU is capable of switching the image to a liquid crystal display monitor of the notebook computer according to the system interrupt signal.

\* \* \* \* \*